(12) United States Patent
Sasai

(10) Patent No.: US 11,039,073 B2
(45) Date of Patent: Jun. 15, 2021

(54) ELECTRONIC APPARATUS AND METHOD FOR CONTROLLING THE SAME

(71) Applicant: CANON KABUSHIKI KAISHA, Tokyo (JP)

(72) Inventor: Kenichiro Sasai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 16/254,411

(22) Filed: Jan. 22, 2019

(65) Prior Publication Data

US 2019/0158761 A1 May 23, 2019

Related U.S. Application Data

(63) Continuation of application No. PCT/JP2017/026387, filed on Jul. 21, 2017.

(30) Foreign Application Priority Data

Jul. 23, 2016 (JP) .............................. JP2016-144987

(51) Int. Cl.
*H04N 5/222* (2006.01)
*H04N 5/232* (2006.01)
(Continued)

(52) U.S. Cl.
CPC ....... *H04N 5/232935* (2018.08); *G03B 17/14* (2013.01); *G03B 17/18* (2013.01);
(Continued)

(58) Field of Classification Search
CPC ........... H04N 5/23216; H04N 5/23293; H04N 5/232933; H04N 5/232127;
(Continued)

(56) References Cited

U.S. PATENT DOCUMENTS

| | | | | |
|---|---|---|---|---|
| 2012/0023447 A1* | 1/2012 | Hoshino | ............... | G06F 40/211 715/823 |
| 2014/0002691 A1* | 1/2014 | Masugi | ............ | H04N 5/232935 348/223.1 |
| 2014/0049677 A1* | 2/2014 | Kawaguchi | ........ | H04N 5/23293 348/333.01 |
| 2015/0055006 A1* | 2/2015 | Kim | ................... | H04N 5/23212 348/333.11 |
| 2018/0324351 A1* | 11/2018 | Yoshimoto | ....... | H04N 5/232939 |

(Continued)

FOREIGN PATENT DOCUMENTS

| | | |
|---|---|---|
| CN | 1893561 A | 1/2007 |
| CN | 102215344 A | 10/2011 |

(Continued)

*Primary Examiner* — Kelly L Jerabek
(74) *Attorney, Agent, or Firm* — Canon U.S.A., Inc. IP Division

(57) ABSTRACT

An electronic apparatus performs first type processing or second type processing based on whether or not a predetermined touch operation that does not include a shift of a touch position onto an operation surface is detected after a touch on the operation surface is detected. The first type processing is processing of displaying an item on a display at a position which has shifted in accordance with an amount of a shift of the touch position from a position where the item was displayed before detection of the shift of the touch position without displaying, at a position corresponding to a touch start position, the item. The second type processing is processing of displaying the item at a position that is not based on the position where the item was displayed before detection of the touch operation.

30 Claims, 5 Drawing Sheets

(51) Int. Cl.
    *G03B 17/18*      (2021.01)
    *G06F 3/0488*     (2013.01)
    *G03B 17/14*      (2021.01)
    *G03B 13/36*      (2021.01)
(52) U.S. Cl.
    CPC ........ *G06F 3/0488* (2013.01); *G06F 3/04883* (2013.01); *H04N 5/232* (2013.01); *H04N 5/23216* (2013.01); *H04N 5/232122* (2018.08); *H04N 5/232945* (2018.08); *G03B 13/36* (2013.01); *H04N 5/232933* (2018.08)
(58) Field of Classification Search
    CPC ........ H04N 5/23212; H04N 5/232935; H04N 5/23245; H04N 5/232; H04N 5/232122; H04N 5/232945; H04N 1/00411; H04N 1/00408; G06F 3/0484; G06F 3/0487; G06F 3/04847; G06F 3/04883; G06F 3/0488; G03B 17/20; G03B 17/02; G03B 13/06; G03B 17/14; G03B 17/18; G02B 7/28
    See application file for complete search history.

(56)            References Cited

U.S. PATENT DOCUMENTS

2019/0041726 A1*   2/2019   Nishimura ........... H04N 5/2254

FOREIGN PATENT DOCUMENTS

| CN | 102346759 A  | 2/2012  |
|----|--------------|---------|
| CN | 103248801 A  | 8/2013  |
| CN | 103513918 A  | 1/2014  |
| CN | 103513924 A  | 1/2014  |
| CN | 104281410 A  | 1/2015  |
| CN | 105306824 A  | 2/2016  |
| CN | 105549174 A  | 5/2016  |
| JP | 2011048666 A | 3/2011  |
| JP | 2012-027721 A | 2/2012 |
| JP | 2012-089973 A | 5/2012 |
| JP | 2012-203143 A | 10/2012 |
| JP | 2014131312 A | 7/2014  |
| JP | 2015055953 A | 3/2015  |

* cited by examiner 20 embodiments with reference to the attached drawings.

ELECTRONIC APPARATUS AND METHOD FOR CONTROLLING THE SAME

CROSS-REFERENCE TO RELATED APPLICATIONS

This application is a Continuation of International Patent Application No. PCT/JP2017/026387, filed Jul. 21, 2017, which claims the benefit of Japanese Patent Application No. 2016-144987, filed Jul. 23, 2016, both of which are hereby incorporated by reference herein in their entirety.

TECHNICAL FIELD

The present invention relates to an electronic apparatus and a method for controlling the same, and particularly relates to a technique of setting a position where a predetermined process is performed on a touch panel.

BACKGROUND ART

In recent years, digital still cameras capable of setting an AF position (a position of automatic focus) on a touch panel have been proposed. According to PTL 1, an AF target position is shifted in accordance with a shift of a touch position when a back monitor is touched by a finger while a finder of a digital still camera is viewed, whereas a cursor is displayed in a touch position when the back monitor is touched without viewing the finder.

CITATION LIST

Patent Literature

PTL 1 Japanese Patent Laid-Open No. 2012-203143

However, in the case of the configuration proposed in PTL 1, the AF target position is shifted only in accordance with a shift of a touch position while the finder is viewed. Therefore, if the AF target position is to be shifted to a position which is considerably far from a current setting position, a touch position is required to be shifted by a long distance until the desired position is reached or a shift of a touch position is required to be repeatedly performed. Such a shift of a touch position by a long distance or such a shift of a touch position which is repeatedly performed requires burdensome operations and a long period of time for performing a desired setting.

The present invention has been made in view of the foregoing problems and an object of the present invention is to improve operability when a setting of a position where a predetermined process is performed by a touch operation is performed.

SUMMARY OF INVENTION

The present invention provides an electronic apparatus, comprising: a touch detector capable of detecting a touch operation performed on an operation surface; and a memory and at least one processor which function as: a control unit configured to perform control of switching between first type processing and second type processing to be performed in accordance with a touch operation based on a touch operation performed after start of a touch of the touch operation, the first type processing being processing of displaying an item to be displayed on a display unit, that is located at a position different from the operation surface, at a position of having shifted in accordance with an amount of a shift of the touch position from a position where the item was displayed before detection of the shift of the touch position without displaying, at a position corresponding to a touch start position, the item, and the second type processing being processing of displaying the item to be displayed on the display unit at a position that is not based on the position where the item was displayed before detection of the touch operation and is based on the position where the touch operation was performed, wherein the control unit performs control such that the first type processing is performed in a case where the shift of the touch position is detected after detecting a touch on the operation surface, and performs control such that the second type processing is performed in a case where a predetermined touch operation that does not include the shift of the touch position onto the operation surface is detected after detecting a touch on the operation surface.

Further features of the present invention will become apparent from the following description of exemplary embodiments with reference to the attached drawings.

DESCRIPTION OF EMBODIMENTS

Hereinafter, a preferred embodiment of the present invention will be described with reference to the accompanying drawings.

Figure 1A:
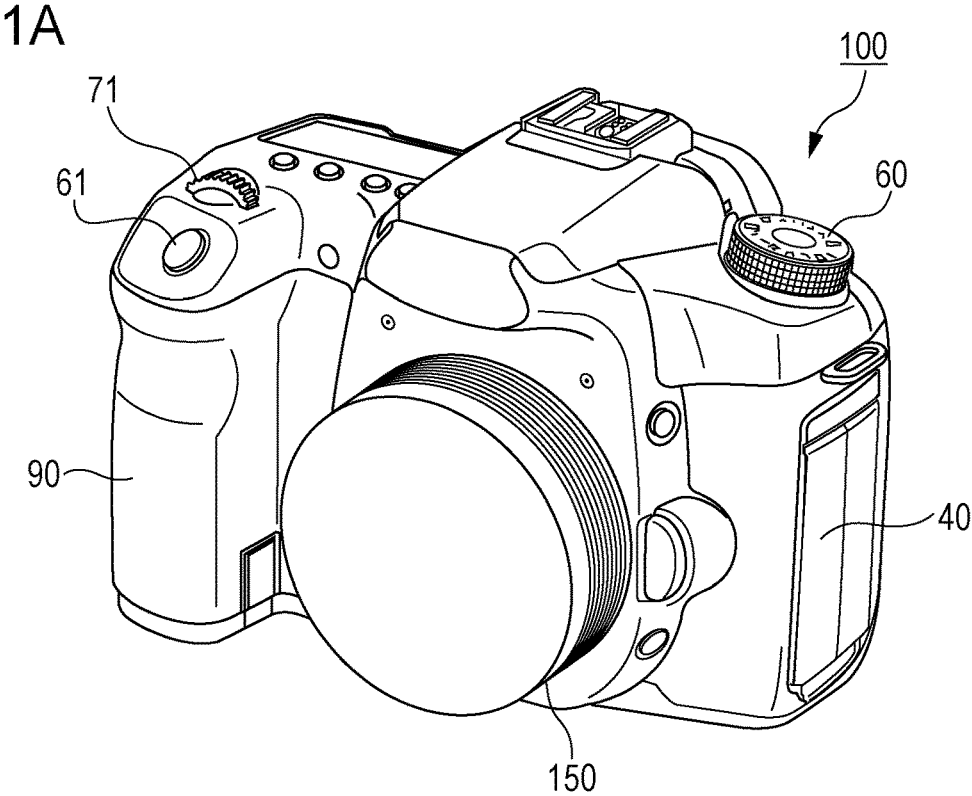
FIG. 1A is a diagram illustrating appearance of a digital still camera which is an example of an apparatus to which a configuration of an embodiment is applicable.
Figure 1B:
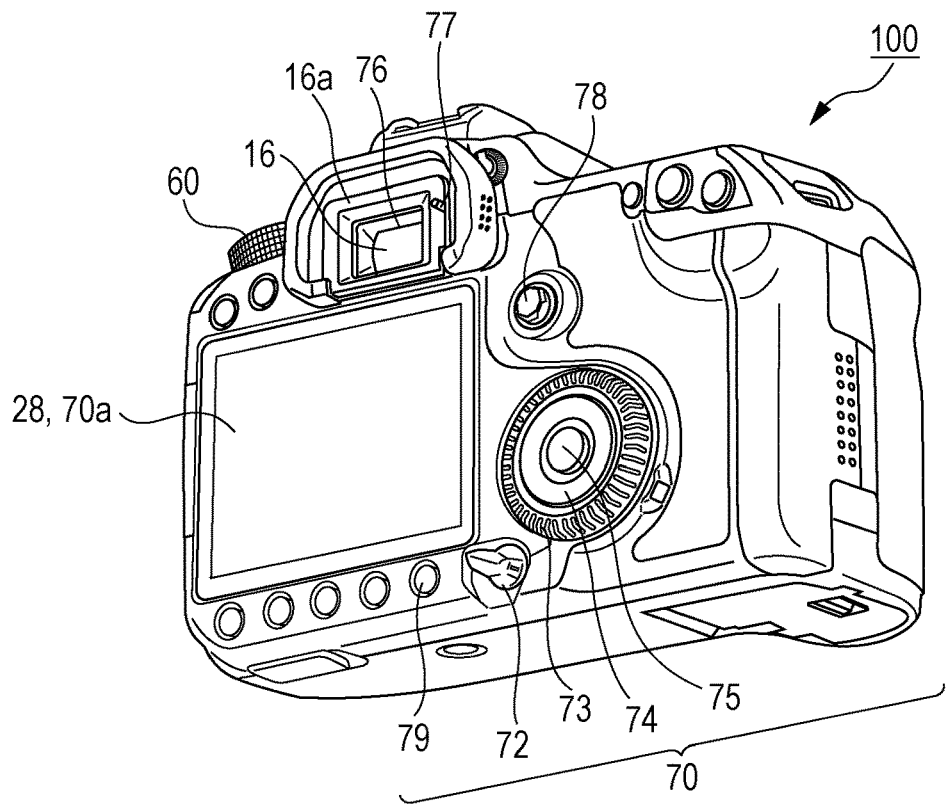
FIG. 1B is a diagram illustrating appearance of the digital still camera which is the example of the apparatus to which the configuration of the embodiment is applicable.

FIGS. 1A and 1B are diagrams illustrating appearance of a digital still camera according to an embodiment of an electronic apparatus to which the present invention is applicable. FIG. 1A is a front perspective view of a digital still camera 100 and FIG. 1B is a back perspective view of the digital still camera 100. A display unit 28 displays images and various information, and a touch panel 70a (an operation surface) which is capable of accepting touch operations (capable of detecting a touch) overlaps on the display unit 28. A shutter button 61 is an operation unit for performing an imaging instruction. A mode switch 60 is a (switchable) operation unit for performing switching among various modes. A terminal cover 40 protects a connector (not illustrated), such as a connection cable, used to connect an external apparatus to the digital still camera 100. A main electronic dial 71 is a rotation operation member, and setting values of a shutter speed and a diaphragm may be changed by rotating the main electronic dial 71. A power source switch 72 is an operation member which performs switching between an On state and an Off state of a power source of the digital still camera 100. A sub-electronic dial 73 is a rotation operation member which performs a shift of a selection frame and feeding of an image. A cross key 74 is four-direction key, and upper, lower, left, and right portions thereof may be independently pressed. An operation corresponding to a pressed one the portions of the cross key 74 may be performed. A SET button 75 is mainly pressed when a selected item is to be determined. An LV (live view) button 78 is used to perform switching between an On state and an Off state of live view display in the display unit 28 in a still image capturing mode. In a moving image capturing mode, the LV button 78 is used to instruct start and stop of shooting (recording) of a moving image. A reproducing button 79 is an operation button which performs switching between an imaging mode and a reproducing mode. When the reproduction button 79 is pressed during the imaging mode, the reproducing mode is entered and a latest image in images recorded in a recording medium 200 may be displayed in the display unit 28. Note that the shutter button 61, the main electronic dial 71, the power source switch 72, the sub-electronic dial 73, the cross key 74, the SET button 75, the LV button 78, and the reproduction button 79 are included in an operation unit 70.

A grip unit 90 is a holding unit (a grasping unit) which enables operation of the digital still camera 100 while the digital still camera 100 is held by a hand. A member of the operation unit 70 is disposed in a position near the grip unit 90 in the digital still camera 100.

The user may view an object image through an optical finder (OVF) when looking into a finder 16 (a finder unit). An eye approach sensor 77 is an object detection means which detects an object approaching within a predetermined distance, such as 1 cm or 2 cm (smaller than the predetermined distance) (eye approach detection or approach detection). When a user's eye approaches the finder 16 so as to view an in-finder display unit 76 (the user looks into an eye approach unit 16a) and the eye approach sensor 77 detects the approaching object (the eye), display in the in-finder display unit 76 overlaps on a subject viewed through the OVF. Furthermore, when the eye approach sensor 77 detects the object (the eye) separated by a predetermined distance or more, display of an item and the like in the in-finder display unit 76 is turned to non-display. Furthermore, although the display unit 28 is brought into a non-display state when the user looks into the finder 16, a touch operation on the touch panel 70a for setting an AF position (a focus adjustment position) or the like may be accepted. When a touch operation is performed by a thumb or the like on the touch panel 70a in a state in which the grip unit 90 is held by a hand and a pointer finger is placed on the shutter button 61, an AF position shifting operation and an issuance of an imaging instruction may be quickly performed while display in the in-finder display unit 76 (and the subject through the OVF) is viewed. However, the display of the finder 16 may be performed by an EVF (electronic view finder) instead of the OVF. When the display unit displayed in the in-finder display unit 76 is the EVF, an image captured by an imaging unit 22 is displayed in the in-finder display unit 76, and the user may visually recognize the subject when looking into the finder 16. As with the display unit 28 described below, the EVF obtains and displays a captured image to be displayed. Furthermore, in the case of the EVF, in addition to the captured image, information on imaging, an AF frame indicating a position where an AF process is performed, and the like may be displayed in the in-finder display unit 76.

A lens unit 150 is detachable from the digital still camera 100.

Figure 2:
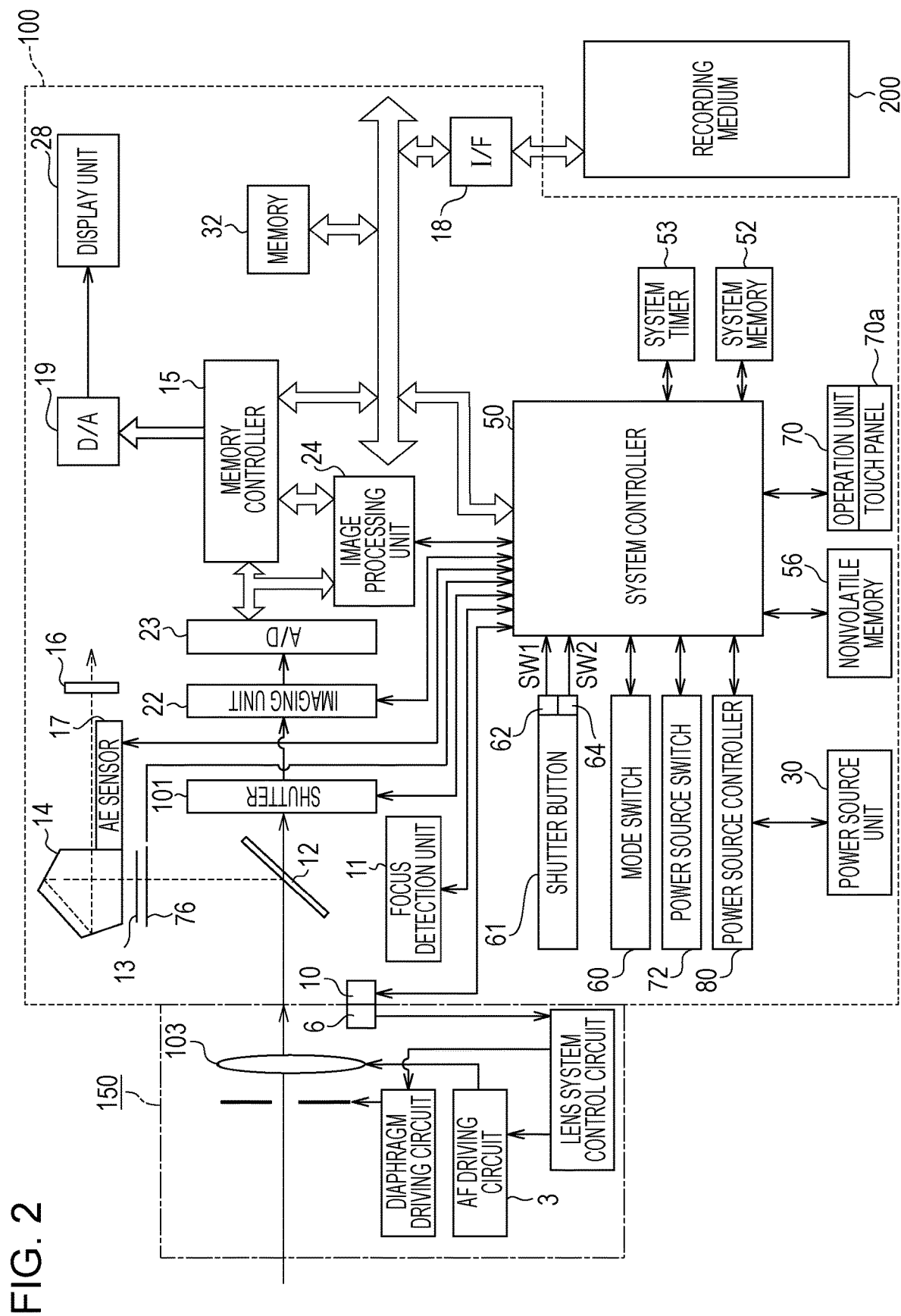
FIG. 2 is a block diagram illustrating an example of a configuration of the digital still camera which is the example of the apparatus to which the configuration of the embodiment is applicable.

FIG. 2 is a block diagram illustrating an example of a configuration of the digital still camera 100 according to this embodiment.

In FIG. 2, the lens unit 150 includes a replaceable imaging lens disposed thereon. Although a lens 103 is normally constituted by a plurality of lenses, only a single lens is simply illustrated here. A communication terminal 6 is used for communication from the lens unit 150 to the digital still camera 100, and a communication terminal 10 is used for communication from the digital still camera 100 to the lens unit 150.

An AE sensor 17 measures luminance of a subject (image) formed on a focusing screen 13 through the lens unit 150 and a quick return mirror 12.

The quick return mirror 12 (hereinafter referred to as a mirror 12) is moved up and down by an actuator, not illustrated, in accordance with an instruction issued by a system controller 50 when exposure, live-view imaging, or shooting of a moving image is performed. The mirror 12 is used to switch a direction of a light flux incoming from the lens 103 between a finder 16 side and an imaging unit 22 side. The mirror 12 is normally disposed so as to reflect the light flux toward the finder 16. However, in a case where imaging is performed or in a case of live-view display, the mirror 12 pops up and retracts from the light flux so that the light flux is guided to the imaging unit 22 (mirror up). Furthermore, the mirror 12 is constituted as a half mirror which allows a portion of light to be transmitted through a center portion thereof, and a portion of the light flux is transmitted so as to be incident on a focus detection unit 11 which performs focus detection.

A photographer may check a focus state and composition of an optical image of a subject obtained through the lens unit 150 by observing an image formed on the focusing screen 13 through a pentaprism 14 and the finder 16.

The in-finder display unit 76 is disposed on an optical path extending from the lens 103 to the finder 16 and displays a frame indicating a current AF position and items (marks and signs) indicating setting states of the camera through the system controller 50. The focusing screen 13 and the in-finder display unit 76 are disposed close to each other and overlap each other so that display of the focusing screen 13 and display of the in-finder display unit 76 may be simultaneously recognized.

The focus detection unit 11 (an AF sensor) employs a phase difference detection method and outputs defocus amount information of a captured image to the system controller 50. The system controller 50 may control the lens unit 150 through the communication terminals 6 and 10 and performs phase difference AF based on the defocus amount information by shifting a position of the lens 103 through an AF driving circuit 3 (AF executable). An AF method may be contrast AF instead of the phase difference AF.

The imaging unit 22 is an imaging element constituted by a CCD element or a CMOS element which converts an optical image in to electric signals. An A/D converter 23 converts an analog signal into a digital signal. The A/D converter 23 is used to convert an analog signal output from the imaging unit 22 to a digital signal.

An image processing unit 24 performs predetermined pixel interpolation, a resizing process, such as size reduction, and a color conversion process on data supplied from the A/D converter 23 or data supplied from a memory controller 15. Furthermore, the image processing unit 24 performs a predetermined calculation process using data on a captured image, and the system controller 50 performs exposure control and ranging control based on an obtained result of the calculation. By this, an AF (autofocus) process employing a TTL (through-the-lens) method, an AE (automatic exposure) process, and an EF (flash preliminary light emission) process are performed. The image processing unit 24 further performs a predetermined calculation process using data on a captured image and performs an AWB (auto white balance) process employing the TTL method based on an obtained result of the calculation.

The display unit 28 is a back monitor (a display unit disposed out of the finder) which displays images, is not limited to a display employing a liquid crystal method as long as the back monitor displays images, and may be a display employing other methods, such as an organic EL display.

Data output from the A/D converter 23 is written in a memory 32 through the image processing unit 24 and the memory controller 15 or directly written in the memory 32 through the memory controller 15. The memory 32 stores image data obtained by the imaging unit 22 and converted into digital data by the A/D converter 23 or image data to be displayed in the display unit 28. The memory 32 has storage capacity which is sufficient for storing a predetermined number of still images and moving images and audio for a predetermined period of time. The memory 32 also serves as a memory (a video memory) for image display. A D/A converter 19 converts data for image display stored in the memory 32 into an analog signal and supplies the analog signal to the display unit 28 and the in-finder display unit 76. In this way, the image data for display written in the memory 32 is displayed by the display unit 28 or the in-finder display unit 76 through the D/A converter 19. The display unit 28 and the in-finder display unit 76 perform display in accordance with the analog signal supplied from the D/A converter 19 on a display device, such as an LCD. The D/A converter 19 converts digital signals which have been obtained by the A/D conversion performed by the A/D converter 23 and stored in the memory 32 into analog signals. Furthermore, the analog signals are successively supplied to the display unit 28 (the EVF when the display in the finder is the EVF) so that the display unit 28 functions as an electronic view finder capable of performing through-image display (live-view display).

A nonvolatile memory 56 is an electrically erasable and recordable memory, such as an EEPROM. The nonvolatile memory 56 stores constants, programs, and the like used in operation of the system controller 50. Here, the programs execute various flowcharts described below in this embodiment.

The system controller 50 controls the entire digital still camera 100. Various processes, described below, in this embodiment are realized by executing the programs recorded in the nonvolatile memory 56 described above. A system memory 52 is a RAM in which constants and variables for operation of the system controller 50, programs read from the nonvolatile memory 56, and the like are developed. Furthermore, the system controller 50 performs display control by controlling the memory 32, the D/A converter 19, the display unit 28, the in-finder display unit 76, and the like.

A system timer 53 is a time measurement unit which measures times used in various control and a time of an incorporated clock.

The mode switch 60, the shutter button 61, and the operation unit 70 are included in an operation unit which inputs various operation instructions to the system controller 50.

The mode switch 60 selects an operation mode of the system controller 50 from among an imaging mode, a reproducing mode, and the like. Furthermore, examples of the mode include various scene modes set for individual imaging scenes, a program AE mode, and a custom mode. The mode switch 60 may directly select one of these modes included in a menu screen. Alternatively, after the menu screen is selected once, one of these modes included in the menu screen may be selected using another operation member.

A first shutter switch 62 generates a first shutter switch signal SW1 when being turned on in course of operation of the shutter button 61 disposed on the digital still camera 100, that is, when being turned on by half-press (an instruction for imaging preparation). In response to the first shutter switch signal SW1, the AF autofocus) process, the AE (automatic exposure) process, the AWB (auto white balance) process, the EF (flash preliminary light emission) process, and the like are started.

A second shutter switch 64 generates a second shutter switch signal SW2 when being turned on by completion of operation of the shutter button 61, that is, when the shutter button 61 is fully pressed (an instruction for imaging). The system controller 50 starts a series of operations of an imaging process from reading of a signal from the imaging unit 22 to writing of image data to the recording medium 200 in response to the second shutter switch signal SW2.

Appropriate functions are assigned to the operation members of the operation unit 70 for each scene by selecting various functional items displayed in the display unit 28, and the operation members serve as various functional buttons. The operation unit 70 at least includes the following operation units: the shutter button 61, the main electronic dial 71, the power source switch 72, the sub-electronic dial 73, the cross key 74, the SET button 75, the LV button 78, and the reproduction button 79. The user may intuitively perform various settings using the menu screen displayed in the display unit 28, the four-direction buttons of upper, lower, left, and right directions, and the SET button.

A power source controller 80 is constituted by a battery detection circuit, a DC-DC converter, a switch circuit which selects a block to be powered, and the like and performs detection of an attached battery, a type of the battery, and a remaining amount of the battery. Furthermore, the power source controller 80 controls the DC-DC converter based on results of the detections and an instruction issued by the system controller 50 and supplies a required voltage to the units including the recording medium 200 for a required period of time. The power source switch 72 accepts an operation of selecting power-On and power-Off.

A power source unit 30 is constituted by a primary battery, such as an alkaline battery or a lithium battery, a secondary battery, such as an NiCd battery, an NiMH battery, or an Li battery, or an AC adapter. A recording medium I/F 18 is an interface relative to the recording medium 200, such as a memory card or a hard disk. The recording medium 200 is a memory card, for example, used to record captured images, and is constituted by a semiconductor memory, a magnetic disk, or the like.

Note that the operation unit 70 includes the touch panel 70a which may detect a contact with the display unit 28. The touch panel 70a and the display unit 28 may be integrally configured. The touch panel 70a is configured such that transmissivity of light does not disturb display of the display unit 28 and is disposed on an upper layer of a display surface of the display unit 28, for example. Then an input coordinate on the touch panel 70a is associated with a display coordinate on the display unit 28. By this, a GUI (graphical user interface) may be configured as if the user may directly operate a screen displayed in the display unit 28. In this way, a setting for accepting an instruction after a position where a touch operation is performed is associated with a position in the display unit 28 is referred to as an absolute coordinate setting.

Furthermore, unlike the absolute coordinate setting, a setting for accepting an instruction relative to a position obtained after a shift from a predetermined position in the display unit 28 in accordance with a shift amount and a shift direction of a touch operation (a position shifted by an amount corresponding to a shift operation) is referred to as a relative coordinate setting.

In a case where an operation is performed while viewing the in-finder display unit 76, when a touch operation is performed in the absolute coordinate setting, the touch panel 70a (the display unit 28) is touched without viewing the touch panel 70a, and therefore, it is highly likely that the touch operation is performed in a position shifted from a desired position. On the other hand, when the touch operation is performed in the relative coordinate setting, an instruction for a shift is issued in accordance with a shift mount instead of a position of the touch operation, and therefore, an instruction for a shift to the desired position may be issued by an operation of a shift to the desired position while viewing a position of an operation target displayed in the in-finder display unit 76. Note that, a function of accepting a touch operation by the touch panel 70a is referred to as a touchpad function although an image is not displayed in the display unit 28.

The system controller 50 may detect following operations on the touch panel 70a or following states of the touch panel 70a.

A finger or a pen which has not been touched on the touch panel has just touched the touch panel, that is, start of a touch (hereinafter referred to as Touch-Down).

A state in which the touch panel is touched by a finger or a pen (hereinafter referred to as Touch-On).

A finger or a pen is shifted while touching the touch panel (hereinafter referred to as Touch-Move).

A finger or a pen which has touched the touch panel is separated from the touch panel, that is, an end of a touch (hereinafter referred to as Touch-Up).

A state in which a touch is not performed on the touch panel (hereinafter referred to as Touch-Off).

When Touch-Down is detected, Touch-On is simultaneously detected. After Touch-Down, Touch-On is continuously detected in a normal state until Touch-Up is detected. Touch-Move is detected while Touch-On is detected. If a touch position is not shifted even when Touch-On is detected, Touch-Move is not detected. After Touch-Up of all fingers or pens which have touched the touch panel is detected, Touch-Off is detected.

The operations, the states, and a positional coordinate where a finger or a pen touches on the touch panel are transmitted to the system controller 50 through an internal bus, and the system controller 50 determines an operation which has been performed on the touch panel based on the supplied information. As for Touch-Move, a sift direction of a finger or a pen which moves on the touch panel may be determined for each vertical component and each horizontal component on the touch panel based on a change of a positional coordinate. A series of operations from detection of Touch-On to quick Touch-Up without Touch-Move is referred to as a tap, and an operation of performing a tap operation twice is referred to as double-tap. Furthermore, an operation of performing Touch-UP after Touch-Down with certain Touch-Move interposed therebetween is referred to as rendering of a stroke. An operation of quick rendering of a stroke is referred to as a flick. The term "flick" means an operation of quickly moving a finger on the touch panel by a certain distance while the finger touches the touch panel and then separating the finger from the touch panel. That is, the term "flick" is an operation of quickly sliding the finger on the touch panel as a flip. When Touch-Up is detected immediately after Touch-Move by a predetermined distance or more at a predetermined speed or more is detected, it may be determined that flick is performed. Furthermore, if Touch-Move by a predetermined distance or more at a predetermined speed or less is detected, it is determined that drug is performed. The touch panel may employ any one of various methods including a resistance film method, an electrostatic capacitance method, a surface acoustic wave method, an infrared method, an electromagnetic induction method, an image recognition method, and an optical sensor method. The various methods further include a method for detecting a touch when contact with the touch panel is detected and a method for detecting a touch when a finger or a pen approaches the touch panel, and any one of the methods may be employed.

Next, an AF position setting process according to this embodiment will be described with reference to FIG. 3. This process is realized when a program recorded in the non-volatile memory 56 is developed in the system memory 52 and executed by the system controller 50. Note that this process is started when the digital still camera 100 is powered and enters the imaging mode.

In step S301, the system controller 50 determines whether the eye approach sensor 77 has detected an approaching object. When the user moves the face close to the finder 16 so as to look into the finder 16, the eye approach sensor 77 detects an approaching object. When it is determined that the eye approach sensor 77 has detected an approaching object, the process proceeds to step S303, and otherwise, the process proceeds to an AF position setting process performed at a time of non-eye-approach in step S302. Note that the process in step S302 onwards may be performed when the process in step S301 is not performed.

In step S302, the system controller 50 performs an AF setting process at the time of non-eye-approach. The AF setting process performed at the time of non-eye-approach will be described hereinafter with reference to FIG. 4.

In step S303, the system controller 50 turns off display of the display unit 28 (the display unit out of the finder). However, in a case where the display unit 28 is already in an Off state (non-display), the process in step S303 is not performed.

Figure 5A:
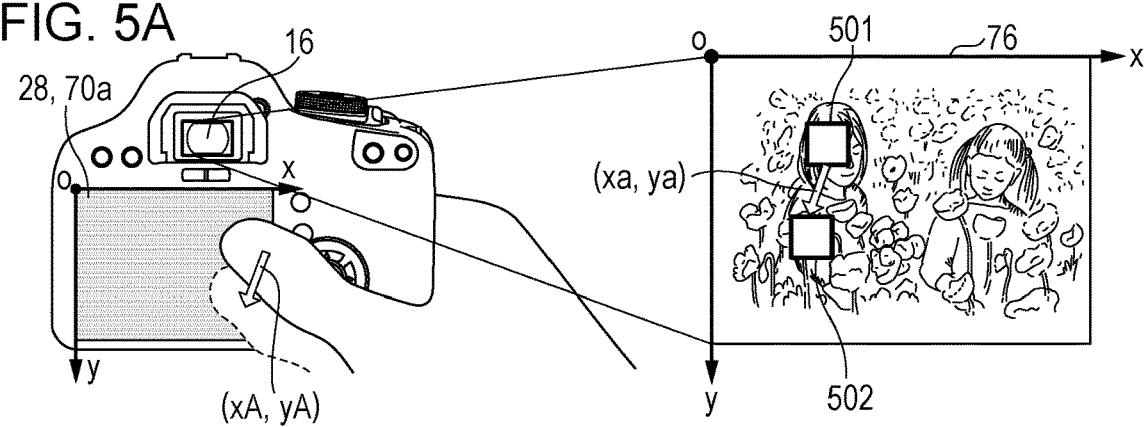
FIG. 5A is a diagram illustrating an example of a state in which an AF frame is shifted according to the embodiment.
Figure 5B:
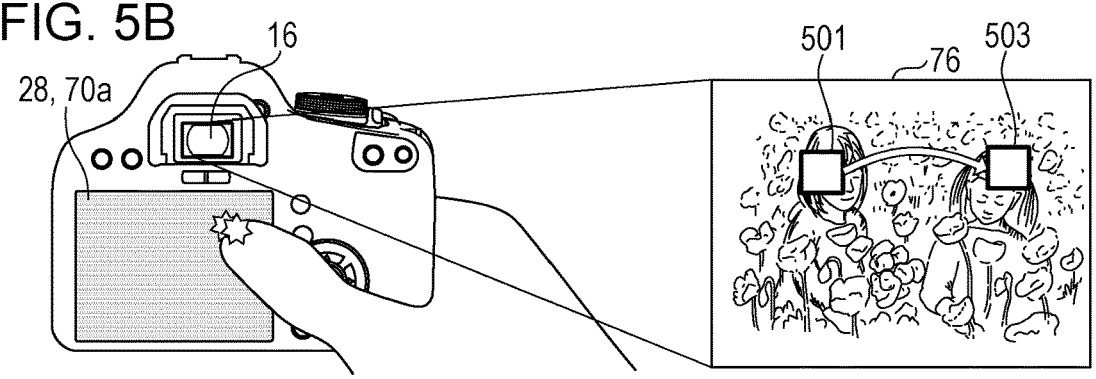
FIG. 5B is a diagram illustrating an example of a state in which the AF frame is shifted according to the embodiment.
Figure 5C:
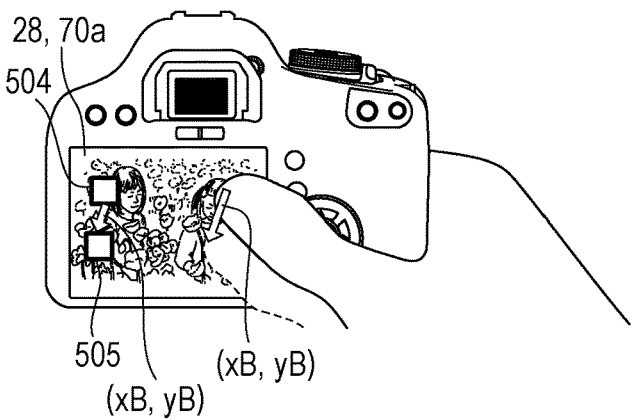
FIG. 5C is a diagram illustrating an example of a state in which the AF frame is shifted according to the embodiment.
Figure 5D:
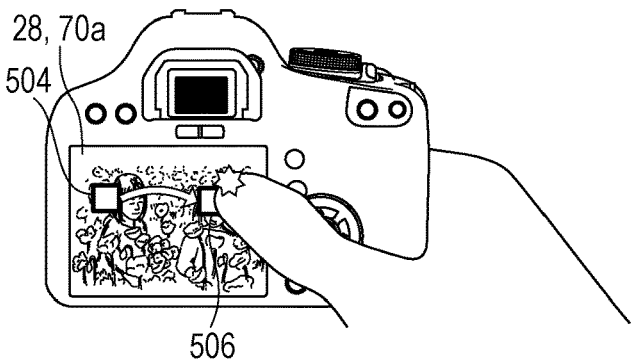
FIG. 5D is a diagram illustrating an example of a state in which the AF frame is shifted according to the embodiment.

In step S304, the system controller 50 turns on display of the in-finder display unit 76 so as to display an AF frame indicating an AF position which is currently set in the in-finder display unit 76 as indicated by an AF frame 501 of FIGS. 5A and 5B. FIGS. 5A and 5B are diagrams illustrating a touch on the touch panel 70a and a display position of the AF frame. States of the AF frame displayed in the in-finder display unit 76 in a case where the user is operating the touch panel 70a while looking into the finder 16 are illustrated in FIGS. 5A and 5B. Furthermore, states of the AF frame displayed in the display unit 28 in a case where the user is operating the touch panel 70a while looking into the display unit 28 (the touch panel 70a) are illustrated in FIGS. 5C and 5D. In a case where the AF position corresponds to an initial position since the user does not change the position when the process in step S304 is performed for the first time after the power is On, the AF position may be set to a center of an imaging range. In coordinates of the display unit 28, the touch panel 70a, and the in-finder display unit 76, an origin is positioned in a left end, a right direction corresponds to a plus direction of an X axis, and a downward direction corresponds to a plus direction of a Y axis. Note that the AF frame may be displayed after Touch-Down is detected in step S305.

In step S305, the system controller 50 determines whether Touch-Down has been performed on the touch panel 70a. When it is determined that Touch-Down has been performed on the touch panel 70a, that is, start of a touch operation has been detected, the process proceeds to step S306, and otherwise, the process proceeds to step S324.

In step S306, the system controller 50 obtains a coordinate (xt, yt) of a position of Touch-Down performed in step S305, records the coordinate (xt, yt) in the system memory 52, and starts measurement of a time t while a timing when Touch-Down is started is set as t=0. The time t is measured so that it is determined whether a period of time until the touch is released is shorter or longer than a predetermined period of time, that is, whether a tap operation has been performed. The time t is measured by the system timer 53.

In step S307, the system controller 50 determines whether the touch has been released from the touch panel 70a (Touch-Up). When it is determined that the touch has been released, the process proceeds to step S312, and otherwise, the process proceeds to step S308.

In step S308, the system controller 50 obtains a coordinate of a current touch position, records the coordinate in the system memory 52, and determines a coordinate of a preceding touch position as (x(t−1), y(t−1)). The coordinate of the preceding touch position indicates the coordinate of Touch-Down obtained in step S306 or a coordinate of a touch position obtained in a preceding process of step S308 (in a case where the process returns to step S308 from the preceding process in step S308 without Touch-Up).

In step S309, the system controller 50 compares the coordinate of the current touch position obtained in step S308 with the coordinate of the touch position obtained in step S306 or the coordinate of the touch position obtained in the preceding process in step S308 so as to determine whether the touch position has been shifted. After the process in step S306, when the process proceeds to step S309 for the first time, the comparison with the coordinate of the touch position obtained in step S306 is performed, and otherwise, the comparison with the coordinate of the touch position obtained in the preceding process in step S308 is performed. When it is determined that the touch position has been shifted, the process proceeds to step S310, and otherwise, the process returns to step S307. In this way, the process after step S310 for shifting a position of the AF frame is not performed unless the touch position is shifted, and the process returns to step S307 where Touch-Up is waited.

In step S310, the system controller 50 calculates a shift vector of a touch position using the coordinate of the preceding touch position (the coordinate of Touch-Down) and the coordinate of the current touch position. The shift vector of a touch position indicates an amount of shift of the touch position on the touch panel 70a and is denoted by (xt−(t−1), yt−y(t−1)).

In step S311, the system controller 50 shifts and displays the AF frame based on the shift vector of the touch position calculated in step S310. In FIG. 5A, when the shift amount of the touch position is denoted by (xA, yA), an AF frame 502 is displayed in a position shifted from the AF frame 501 by (xa, ya) corresponding to (xA, yA) in the in-finder display unit 76. Here, (xa, ya) is obtained in accordance with (xA, yA) based on a rate of a size of the touch panel 70a to a size of the in-finder display unit 76. In a case where the touch panel 70a is twice as large as the in-finder display unit 76, the AF frame is shifted in the in-finder display unit 76 by a half of a distance of the shift of the touch position on the touch panel 70a. In a case where it is determined that Touch-Up is not performed in step S307 and the touch position is shifted in step S309, that is, the touch position is shifted while the touch is continued, the relative coordinate setting is entered and the AF frame is displayed in a position shifted in accordance with a shift direction and a shift distance of the touch position.

In step S312, the system controller 50 determines whether a period of time from when Touch-Down is performed in step S305 to when the touch is released in step S307 is smaller than a predetermined period of time α. Specifically, the system controller 50 determines whether the time t in which measurement is started in step S306 satisfies t<α. When it is determined that t<α is satisfied, that is, when it is determined that a tap operation has been performed, the process proceeds to step S313, and otherwise, the process proceeds to step S315. Here, "α" indicates a period of time, such as 0.1 seconds or 0.2 seconds, that is, a period of time from when a touch is performed to when the touch is quickly released. Since it is determined whether a period of time from Touch-Down to Touch-Up is smaller than a predetermined period of time in step S312, a difference from a nose touch in which a nose of the user touches the touch panel 70a may be easily distinguished. Specifically, if the user unwillingly touches the touch panel 70a by the nose when looking into the finder 16, it is highly likely that the nose is immediately separated from the touch panel 70a so that the touch is instantaneously ended, and therefore, when a tap operation is detected, it is highly likely that the operation is desired by the user. Therefore, it is highly likely that an undesired touch, such as the nose touch, and an operation desired by the user are distinguished from each other based on a period of time from Touch-Down to Touch-Up.

In step S313, the system controller 50 determines the coordinate of the touch position obtained in step S306 as "(xt, yt)=(x1, y1)" and records the coordinate in the system memory 52. Here, "(x1, y1)" indicates a coordinate of the touch position of the tap operation performed in step S305 to step S307.

In step S314, the system controller 50 starts measurement of a time T while a timing when a first tap is terminated is set as T=0. The time T is measured to determine whether a period of time until a next tap is started is shorter or longer than a predetermined period of time. Specifically, the time T is used to determine whether a tap operation has been consecutively performed. The time T is measured by the system timer 53.

In step S315, the system controller 50 determines an AF position in a position where the AF frame is currently displayed and records the AF position in the system memory 52. Specifically, the AF position is determined in the position where the AF frame is displayed in step S311 or the position where the AF frame is displayed in step S304 if the touch position has not been shifted from that in step S305. When the determination is negative in step S312, that is, when a tap operation is not performed but the touch is released while the touch position is not shifted, the AF frame is not shifted to the touch position unlike double-tap described below, and therefore, the AF position is not changed even in a case of an undesired touch. Furthermore, although the AF position is changed when the touch is released after the touch position is shifted in step S309, the AF frame is not shifted when the touch is released without a shift of the touch position after the touch, and therefore, the AF position is not changed even when the touch is released. Therefore, even if the nose touch occurs at a time of eye approach, it is difficult to change an AF position since a position of the nose is not largely shifted when compared with a shift of a finger.

In step S316, the system controller 50 determines whether the time T in which the measurement thereof is started in step S314 is smaller than a predetermined period of time β. If a touch is not started in step S317 before the time T elapses the predetermined period of time β and a next tap is performed, it is not determined that double-tap in which tap is consecutively performed has been performed, and therefore, a process from step S317 to step S323 for the double-tap is not performed. When it is determined that the time T in which the measurement thereof is started in step S314 is smaller than β, the process proceeds to step S317, and otherwise, the process proceeds to step S305 where Touch-Move or a first tap operation is waited again. Here, β indicate a period of time, such as 0.1 seconds or 0.2 seconds. The process from step S316 to step S320 is performed to determine whether a second tap operation is consecutively performed within a predetermined period of time after the first tap operation is performed. As described in step S313, the possibility that the tap operation is performed by the nose touch is lower than the possibility that the tap operation is performed by a finger, and therefore, the possibility that the AF position is shifted due to the nose touch may be further reduced by a double-tap operation in which a tap operation is consecutively performed.

In step S317, as with the case of step S305, the system controller 50 determines whether Touch-Down has been performed on the touch panel 70a. When it is determined that Touch-Down on the touch panel 70a, that is, start of a touch operation, has been detected, the process proceeds to step S318, and otherwise, the process proceeds to step S316 where Touch-Down performed within the predetermined period of time β is waited. When Touch-Down is not performed within the predetermined period of time β, the AF position is not shifted even if a tap operation is performed.

In step S318, the system controller 50 obtains a coordinate (x2, y2) of a position of Touch-Down performed in step S317, records the coordinate in the system memory 52, and starts measurement of the time t while a timing when Touch-Down is started is set to t=0 as with the case of step S306.

In step S319, the system controller 50 determines whether a touch has been released from the touch panel 70a (Touch-Up). When it is determined that the touch has been released, the process proceeds to step S320, and otherwise, Touch-Up is waited. Alternatively, the process proceeds to step S309 where it is determined whether the touch position is to be shifted. A touch performed after the first tap operation is Touch-Move, the relative coordinate setting is entered.

In step S320, the system controller 50 determines whether a period of time from when Touch-Down is performed in step S317 to when the touch is released in step S319 is smaller than the predetermined period of time α. Specifically, it is determined whether the time t in which the measurement is started in step S318 is smaller than α. When it is determined that t is smaller than α, the process proceeds to step S321, and otherwise, the process proceeds to step S305.

In step S321, the system controller 50 determines whether the coordinate (x1, y1) of the first tap operation obtained in step S313 is close to the coordinate (x2, y2) of the second tap operation obtained in step S318. Specifically, it is determined whether the coordinates of the tap operations which are consecutively performed are close to each other. If a distance between the coordinate of the first tap operation and the coordinate of the second tap operation is within 0.5 cm or 0.3 cm, for example, it is determined that the coordinates are close to each other. When it is determined that the first tap operation and the second tap operation are close to each other, the process proceeds to step S322, and otherwise, the process proceeds to step S305.

In step S322, the system controller 50 displays the AF frame in the in-finder display unit 76 based on the coordinate (x1, y1) of the position of the first tap operation as indicated by an AF frame 503 of FIG. 5B. The relationship between the touch position coordinate on the touch panel 70a and the coordinate where the AF frame is displayed in the in-finder display unit 76 corresponds to the relationship between the touch panel 70a and the in-finder display unit 76. For example, in a case where the touch panel 70a is twice as large as the in-finder display unit 76 and the touch position coordinate of the first tap operation is (x1, y1), a coordinate of the AF frame displayed in the in-finder display unit 76 is (x1/2, y1/2). In this way, when the double-tap is performed, that is, when a predetermined touch operation which is not accompanied with (which does not include) a shift of a touch position is performed, the absolute coordinate setting in which the AF frame is displayed based on the touch position is entered. As illustrated in FIG. 5B, in a case where a position which is originally set corresponds to the AF frame 501 near a left end in the in-finder display unit 76 and the user intends to move the AF frame toward a right end, a touch position is required to be shifted a number of times corresponding to a distance of a shift of the AF frame from the left end to the right end when the relative coordinate setting is employed. However, when double-tap is performed on a portion near the right end, the AF frame is shifted to a position of the AF frame 503, and therefore, the AF position may be shifted by a smaller number of operations without shifting the touch position by the distance between the both ends of the touch panel 70a.

In step S323, the system controller 50 determines an AF position in a position where the AF frame is currently displayed and records the AF position in the system memory 52 similarly to step S315. Specifically, the position corresponds to the position where the double-tap is performed and the AF position is determined in the position where the AF frame is displayed in step S322. Furthermore, if the AF position is to be adjusted, a touch position is shifted after the position is roughly determined by double-tap.

In step S324, the system controller 50 determines whether an instruction for preparing imaging has been issued. The imaging preparation instruction may be issued by a half press of the shutter button 61. When it is determined that the imaging preparation instruction has been issued, the process proceeds to step S325, and otherwise, the process proceeds to step S328.

In step S325, the system controller 50 performs the AF process in the AF position set in step S315 or step S323. Note that the timing when the AF process is performed may coincide with the timing when the AF position is set in step S315 or step S323 or the AF process may be executed when an operation of changing the AF position is not performed for a predetermined period of time after the AF position is set.

In step S326, the system controller 50 determines whether an imaging instruction has been issued. The imaging instruction may be issued by fully pressing the shutter button 61. When it is determined that the imaging instruction has been issued, the process proceeds to step S327, and otherwise, the process proceeds to step S328.

In step S327, the system controller 50 performs an imaging process. In step S327, a captured image which has been subjected to the AF process in the AF position set by the user is recorded in the recording medium 200.

In step S328, the system controller 50 determines whether the AF position setting process is to be terminated. The AF position setting process is terminated when the power is Off or the screen is switched to the menu screen or the reproducing screen. When it is determined that the AF position setting process is to be terminated, the AF position setting process is terminated, and otherwise, the process proceeds to step S301.

Next, the AF position setting process performed at the time of non-eye-approach in step S302 of FIG. 3 will be described with reference to FIG. 4. This process is realized when a program recorded in the nonvolatile memory 56 is developed in the system memory 52 and executed by the system controller 50. Note that this process is started when the process proceeds to step S302.

In step S401, the system controller 50 turns off display in the in-finder display unit 76. Note that the process in step S401 is not performed when the in-finder display unit 76 is already in an Off state (non-display).

In step S402, the system controller 50 turns on the display of the display unit 28 so that a live-view image (an LV image or a through image) is displayed, and an AF frame indicating an AF position which is currently set is displayed as indicated by an AF frame 504 of FIGS. 5C and 5D.

In step S403, the system controller 50 determines whether Touch-Down has been performed on the touch panel 70a. When it is determined that Touch-Down has been performed on the touch panel 70a, that is, start of a touch operation is detected, the process proceeds to step S404, and otherwise, the process proceeds to step S324 of FIG. 3.

In step S404, the system controller 50 obtains the position where Touch-Down is performed in step S403 or a coordinate (xt, yt) of a current touch position and records the position or the coordinate in the system memory 52.

In step S405, the system controller 50 determines whether an input method of a touch operation at a time of non-eye-approach which is currently set by the user is the absolute coordinate setting or the relative coordinate setting. The input method of a touch operation at the time of non-eye-approach may be set in the menu screen. When it is determined that the input method of a touch operation at the time of non-eye-approach is the absolute coordinate setting, the process proceeds to step S406, and otherwise, the process proceeds to step S409.

In step S406, the system controller 50 displays the AF frame in the coordinate (xt, yt) in the touch position obtained in step S404 as indicated by an AF frame 506 of FIG. 5D. Specifically, when the user operates the touch panel 70a while viewing the display unit 28 and the absolute coordinate setting is made, the AF frame is displayed in a coordinate immediately under a finger of the user touching the touch panel 70a.

In step S407, the system controller 50 determines whether the touch has been released from the touch panel 70a (Touch-Up). When it is determined that the touch has been released, the process proceeds to step S408, and otherwise, the process proceeds to step S404. Since the AF frame is displayed in the touch position in the case of the absolute coordinate setting, the obtainment of the coordinate of the touch position in step S404 and the display of the AF frame in step S406 are repeatedly performed until Touch-Up is performed.

In step S408, the system controller 50 determines an AF position in the position where the AF frame is currently displayed and records the AF position in the system memory 52. In this way, when the touch panel 70a is operated while viewing the display unit 28, the AF position is determined in a position where Touch-Up is performed. Although an undesired AF position is likely to be set due to a nose touch onto the touch panel 70a, the possibility of a nose touch is low at the time of non-eye-approach, and therefore, the AF position may be set by a smaller number of operations when the AF position is set in a position where the touch is released. Accordingly, operability is improved.

In step S409, the system controller 50 obtains a coordinate of the current touch position, records the coordinate as (xt, yt) in the system memory 52, and determines a coordinate of a preceding touch position as (x(t−1), y(t−1)). The coordinate of the preceding touch position indicates a coordinate of Touch-Down in step S404 or a coordinate of the touch position in the preceding process of step S409 (in a case where the process returns to step S409 from the preceding process of step S409 without Touch-Up).

In step S410, the system controller 50 compares the coordinate of the touch position obtained in step S409 with the coordinate of the touch position obtained in step S404 or the coordinate of the preceding touch position so as to determine whether the touch position has been shifted. When it is determined that the touch position has been shifted, the process proceeds to step S411, and otherwise, the process proceeds to step S413.

In step S411, the system controller 50 calculates a shift amount of the touch vector using the coordinate of the preceding touch position and the coordinate of the current touch position. The shift amount of the touch vector is denoted by (xt−(t−1), yt-y(t−1)).

In step S412, the system controller 50 shifts and displays the AF frame based on the shift vector of the touch position calculated in step S411. In FIG. 5C, when the shift vector of the touch position is (xt−(t−1), yt-y(t−1))=(xB, yB), the display unit 28 displays an AF frame 505 in a position shifted from the AF frame 504 by (xB, yB) in the display unit 28.

In step S413, the system controller 50 determines whether the touch is released from the touch panel 70a (Touch-Up). When it is determined that the touch has been released, the process proceeds to step S414, and otherwise, the process returns to step S409.

In step S414, the system controller 50 determines an AF position in a position where the AF frame is currently displayed and records the AF position in the system memory 52.

According to the embodiment described above, the absolute coordinate setting and the relative coordinate setting may be switched from one to another in accordance with a type of a touch operation performed by the user, and accordingly, an operation of shifting a position may be performed with high operability. When the position is to be considerably shifted, an operation of double-tap is performed so that the absolute coordinate setting is entered. In this case, an operation of shifting a touch position to be performed a large number of times in the relative coordinate setting may be omitted, and an AF position may be quickly shifted close to a desired position. Furthermore, when a current position is to be shifted by a small amount in an X direction in the relative coordinate setting, an AF position is not immediately changed to a touch position unlike the case of the absolute coordinate setting. Therefore, a touch position may be shifted to a desired position by shifting the touch position in the X direction even if the touch position is shifted from a Y coordinate of a current AF position. Specifically, in a case where the user intends to shift an AF position in a certain position and the AF position is actually shifted to the position, the AF position may be immediately shifted to the desired position by double-tap, and in a case where the user intends to shift the AF position from a current position by a certain amount, the AF position may be shifted by the desired amount by shifting a touch position. Furthermore, the AF position may be shifted by double-tap in the absolute coordinate setting, and therefore, the possibility of a shift of the AF position due to a nose which may not finely perform a touch operation is reduced. Furthermore, the AF position is not shifted without shifting a touch position even in the relative coordinate setting, and therefore, the possibility of a shift of an AF position due to a nose which may not shift a touch position is reduced. Accordingly, the possibility of an undesired process may be reduced.

Note that, as a method for determining double-tap, methods other than the method described above may be employed as long as a quick operation of a touch and a release of the touch which are consecutively performed is detected twice, and an AF position may be set in a position where a second tap is performed or an intermediate position between positions of two tap operations.

Figure 4:
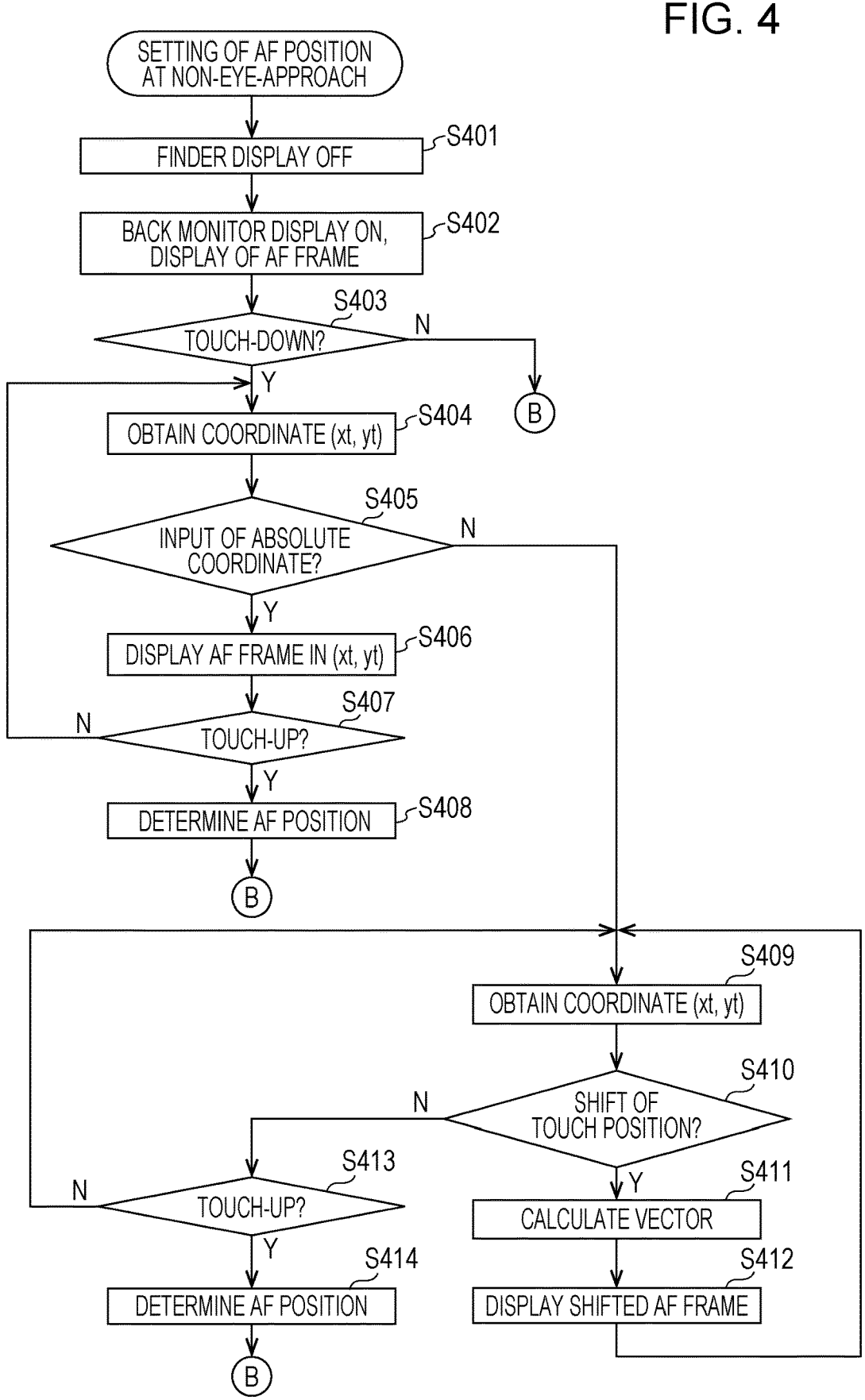
FIG. 4 is a flowchart of the AF position setting process performed at a time of non-eye-approach.

Although it is determined whether the absolute coordinate setting or the relative coordinate setting has been made in step S405 of FIG. 4, the absolute coordinate setting is employed at the time of non-eye-approach.

Figure 3:
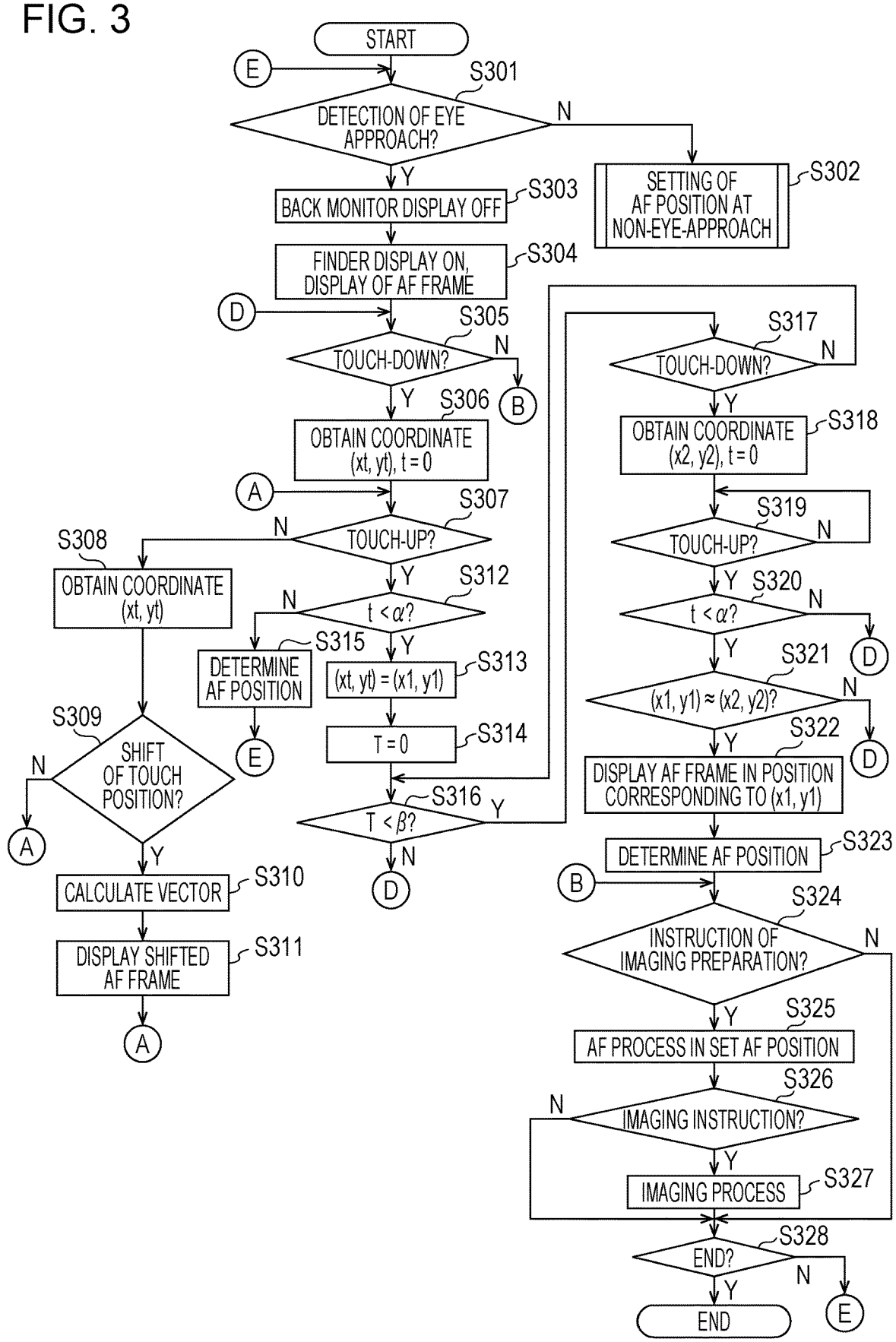
FIG. 3 is a flowchart of an AF position setting process according to this embodiment.

Furthermore, although, in a case where double-tap is performed in FIG. 3, an AF position is set in a position where the double-tap is performed in the absolute coordinate setting according to this embodiment, operations other than the double-tap may be performed. Specifically, the operations may include a tap operation, a long touch operation in which a touch is continued in the same position for a predetermined period of time or more, and a press operation. The operability of the user is improved when the AF position is set in the absolute coordinate setting by a tap operation irrespective of a single tap operation or two tap operations. Specifically, in a case where a touch is released before a predetermined period of time has elapsed without shifting a touch position after the touch is started, the absolute coordinate setting is made. In a case where a touch is released after a predetermined period of time has elapsed irrespective of a shift of the touch position after the touch is started, the relative coordinate setting is made. When a single tap operation is set and the user has performed an undesired touch, an AF position is not shifted unless Touch-Up is instantaneously performed or unless a touch position is shifted, and therefore, the possibility that an undesired process is performed may be reduced. Furthermore, in the case of the press operation, the press operation is detected by a touch panel capable of detecting a press operation. When a press operation of a predetermined pressure or more is detected, an AF frame is displayed in a coordinate of the in-finder display unit 76 corresponding to a coordinate of the touch panel 70a where the press operation is performed. When the determination is to be made in accordance with a pressure, it is determined whether a pressure to the touch panel 70a (which is detected as large or small) becomes larger by a predetermined amount or more. Note that the case of the long touch is effective when a nose touch is not required to be taken into consideration, such as a case where a touch pad of a laptop PC is operated. However, malfunction caused by an operation which is undesired by the user may be avoided when double-tap is performed as described above.

Note that the determination may be affirmative in step S309 when a touch position is shifted by a predetermined distance, such as 2 cm or 3 cm, or more, for example, so that a nose touch and a shift of a touch position by a finger are distinguished from each other, and an AF frame may be determined in a shifted position in accordance with a shift amount obtained after the shift by the predetermined distance. Specifically, Touch-Down is performed, then the shift by 2 cm is performed, a shift in an X direction and a Y direction corresponding to (xe, ye) is performed, a distance AF frame corresponding to (xe, ye) is shifted and displayed in the in-finder display unit 76, and an AF position is determined when the touch is released.

Furthermore, the absolute coordinate setting may be made by a single tap operation instead of the double-tap in recording of a moving image, and the absolute coordinate setting may be made by double-tap when a moving image is not being recorded. During recording of a moving image, vibration is less applied on the digital still camera 100 when an AF position is determined by a single tap operation, which is preferable.

Furthermore, a display form of the AF frame may be changed so that the user may recognize whether the AF position is currently changed in the relative coordinate setting or the AF position currently displayed has been changed in the absolute coordinate setting. Specifically, the AF frame may be displayed by a thick frame after double-tap is performed, and the AF frame may be displayed by a normal thickness when the AF frame is shifted due to a shift of a touch position. As the display form, in addition to the change of a width of a line of the AF frame, the line may be changed to a dotted line or an intent may be changed. Furthermore, the display form of the AF frame may be changed in accordance with a determination of an AF position.

Note that, although the case where a position where a predetermined process, such as the AF process, is performed is changed is illustrated in the foregoing embodiment, this embodiment is applicable also when a region to be displayed in the display unit 28 is selected in reproduction of an image. That is, when double-tap is performed, an image is shifted without enlarging the image such that a region corresponding to the double-tap is positioned at a center of the display unit 28, and when a touch position is shifted, a region which is shifted in accordance with the shift of the touch position from a current display region is displayed.

Furthermore, although the case where the absolute coordinate setting and the relative coordinate setting are switched from one to another when the finder 16 is viewed in accordance with a type of a touch operation is described in the embodiment described above, the embodiment is applicable to a case where the finder 16 is not viewed. The embodiment is applicable to a case where an operation is performed by a touch pad and display is performed by an apparatus having the touch pad on an external output destination using an HDMI (registered trademark) or in a wireless manner. Furthermore, the embodiment is applicable to a case where a cursor or an index on a screen is operated by operating a touch pad of a laptop PC or the like. In a case where an operation is performed on a large display unit, such as a laptop PC, a cursor may be immediately shifted by double-tap or tap without performing Touch-Move on the touch pad a number of times, and accordingly, operability is improved. Even when an image, an item, or a scroll bar is pinched and shifted by a cursor, a shift may be immediately performed by performing double-tap without performing Touch-Move by a long distance. In this case, double-tap is performed after an object to be shifted is selected.

According to the foregoing embodiment, the present invention is applied to the digital still camera 100, for example. However, the invention is not limited to this example, and the invention is applicable to any electronic apparatus as long as the electronic apparatus is capable of controlling settings of a position where a process based on a specific position (a specific process), such as an AF process, an AE process (auto exposure process), or an AWB process (auto white balance process) is performed. Specifically, the present invention is applicable to a personal computer (PC), a cellular phone terminal, a mobile-type image viewer, a digital photo frame, a music player, a game machine, an electronic book reader, a tablet PC, a smartphone, a projection apparatus, home electronics having a display unit, and the like. The present invention is further applicable to apparatuses, such as a smartphone, a tablet PC, and a desktop PC, which receive and display a live view image captured by a digital still camera or the like in a wired or wireless manner and remotely control the digital still camera (including a network camera).

Other Embodiments

The present invention is realized by executing the following process. Specifically, software (a program) which realizes functions of the foregoing embodiment is supplied to a system or an apparatus through a network or various recording media, and a computer (or a CPU or an MPU) of the system or the apparatus reads and executes a program code. In this case, the program and the storage media which store the program are included in the present invention.

According to the present invention, operability is improved when a setting of a position where a predetermined process is performed by a touch operation is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus, comprising:
a touch detector capable of detecting a touch operation performed on an operation surface; and
a memory and at least one processor which function as:
a control unit configured to perform first type processing and second type processing,
the first type processing being processing of displaying an item to be displayed on a display unit, that is located at a position different from the operation surface, at a position of having shifted in accordance with an amount of a shift of the touch position from a position where the item was displayed before detection of the shift of the touch position without displaying, at a position corresponding to a touch start position, the item, and
the second type processing being processing of displaying the item to be displayed on the display unit at a position that is not based on the position where the item was displayed before detection of the touch operation and is based on the position where the touch operation was performed,
wherein the control unit
determines whether to perform the first type processing or to perform the second type processing depending on whether a shift of the touch position is detected after detecting a touch on the operation surface or a touch operation of releasing the touch from the operation surface without including the shift of the touch position onto the operation surface is detected after detecting the touch on the operation surface,
performs control such that the first type processing is performed in a case where the shift of the touch position is detected after detecting the touch on the operation surface, and
performs control such that the second type processing is performed in a case where the touch operation of releasing the touch from the operation surface without including the shift of the touch position onto the operation surface is detected after detecting the touch on the operation surface.

2. The electronic apparatus according to claim 1, wherein the item indicates a position where a specific process is to be performed.

3. The electronic apparatus according to claim 2, wherein the memory and at least one processor further function as a processing unit configured
to perform the specific process based on a position where the item is displayed in response to release of a touch from the operation surface after a shift of a touch position is detected on the operation surface and
to perform the specific process based on a position where the predetermined touch operation is performed in response to detection of the predetermined touch operation.

4. The electronic apparatus according to claim 2, wherein the memory and at least one processor further function as:
a reception unit configured to receive an instruction for performing the specific process issued by a user; and
a processing unit configured to perform the specific process based on a position where the item is displayed in response to the instruction received by the reception unit.

5. The electronic apparatus according to claim 2, wherein the specific process is at least one of autofocus, automatic exposure, and auto white balance.

6. The electronic apparatus according to claim 1, further comprising:
an approach detector configured to detect an object approaching a finder unit which enables recognition of the display unit by an eye through an eye approach unit,
wherein the control unit
performs control such that the item is displayed in the display unit without displaying the item in a display device out of a finder which is integrally configured with the operation surface when the approach detector detects an approaching object, and
performs control such that the item is displayed in the display device out of the finder without displaying the item in the display unit when the approach detector does not detect an approaching object.

7. The electronic apparatus according to claim 6, wherein the control unit performs the control when the approach detector detects an approaching object and displays the item in the display unit.

8. The electronic apparatus according to claim 6, wherein the control unit performs control such that the item is displayed at a position where the touch is started on the operation surface when the approach detector does not detect an approaching object and the item is displayed in the display device out of the finder.

9. The electronic apparatus according to claim 1, wherein the control unit performs control such that the second type processing is performed in a case where an operation of releasing a touch from the operation surface without shifting a touch position from a position where a touch operation is started is performed before a predetermined period of time has elapsed after start of the touch operation onto the operation surface is detected.

10. The electronic apparatus according to claim 9, wherein the control unit performs control such that the item is displayed in a position which is not based on a position where the touch operation is performed in a case where a touch is released from the operation surface without shifting a touch position from a position where the touch operation is started when the predetermined period of time has elapsed after start of the touch operation on the operation surface is detected.

11. The electronic apparatus according to claim 1, wherein the display unit is incorporated in a finder unit which enables recognition of a subject by an eye through an eye approach unit and the operation surface is out of the finder unit.

12. The electronic apparatus according to claim 1, wherein the control unit performs control such that a shift of a touch position on the operation surface is detected in a case where a touch position on the operation surface is changed by a predetermined amount or more.

13. The electronic apparatus according to claim 1, wherein the predetermined touch operation is a tap operation which is an operation of releasing a touch without shifting a touch position after the touch is started on the operation surface.

14. The electronic apparatus according to claim 1, wherein the predetermined touch operation is a double-tap operation which is an operation of performing twice a tap operation, the tap operation is an operation of releasing a touch without shifting a touch position after the touch is started on the operation surface.

15. The electronic apparatus according to claim 1, further comprising:
a press detector at least capable of determining whether a pressure onto the operation surface is large or small,
wherein the predetermined touch operation is an operation which increases a pressure onto the operation surface by a predetermined amount or more.

16. The electronic apparatus according to claim 1, wherein the predetermined touch operation is a long-touch operation which is an operation of releasing a touch after the touch is continued for a predetermined period of time or more without shifting a touch position after the touch is started on the operation surface.

17. The electronic apparatus according to claim 1, further comprising:
an imaging sensor,
wherein the control unit performs control such that an image obtained by the imaging sensor and the item are displayed on the display unit in an overlapping manner.

18. An electronic apparatus, comprising:
a touch detector capable of detecting a touch operation performed on an operation surface; and
a memory and at least one processor which function as:
a control unit configured to perform first type processing and second type processing,
the first type processing being an instruction of pointing a position of having shifted in accordance with an amount of a shift of a touch position from a position that was pointed before detection of the shift of the touch position without pointing a position corresponding to a touch start position, and
the second type processing being an instruction of pointing a position that is not based on the position that was pointed before detection of the touch operation and is based on the position where the touch operation was performed,
wherein the control unit
determines whether to perform the first type processing or to perform the second type processing depending on whether a shift of the touch position is detected after detecting a touch on the operation surface or a touch operation of releasing the touch from the operation surface without including the shift of the touch position onto the operation surface is detected after detecting the touch on the operation surface,
performs control such that the first type processing is performed in a case where the shift of the touch position is detected after detecting the touch on the operation surface, and
performs control such that the second type processing is performed in a case where the touch operation of releasing the touch from the operation surface without including the shift of the touch position onto the operation surface is detected after detecting the touch on the operation surface.

19. The electronic apparatus according to claim 18, further comprising:
an approach detector configured to detect an object approaching a finder unit which enables recognition of the display unit by an eye through an eye approach unit,
wherein the control unit performs the control when the approach detector detects an approaching object.

20. The electronic apparatus according to claim 18, wherein the memory and at least one processor further function as a processing unit configured to perform a specific process based on the position instructed by the control unit.

21. The electronic apparatus according to claim 18, wherein the memory and at least one processor further function as a display control unit configured to display an item indicating a position instructed by the control unit.

22. The electronic apparatus according to claim 18, wherein the control unit performs control such that the second type processing is performed in a case where an operation of releasing a touch from the operation surface is performed without shifting the touch position from a position where the touch operation is started before the predetermined period of time has elapsed after start of the touch operation on the operation surface is detected.

23. The electronic apparatus according to claim 22, wherein the control unit performs control such that a position which is not based on a position where the touch operation is performed is instructed in a case where a touch is released from the operation surface without shifting a touch position from a position where the touch operation is started when the predetermined period of time has elapsed after start of the touch operation on the operation surface is detected.

24. An electronic apparatus, comprising:
a touch detector capable of detecting a touch operation performed on an operation surface; and
a memory and at least one processor which function as:
a setting unit configured to set a focus adjustment position, and
a control unit configured to perform first type processing and second type processing,
the first type processing being an instruction of shifting the position selected by the setting unit in accordance with the shift of the touch position, and
the second type processing being an instruction of causing the setting unit to perform position selection based on the position where the touch operation was performed,
wherein the control unit
determines whether to perform the first type processing or to perform the second type processing depending on whether a shift of the touch position is detected after detecting a touch on the operation surface or a touch operation of releasing the touch from the operation surface without including the shift of the touch position onto the operation surface is detected after detecting the touch on the operation surface,
performs control such that the first type processing is performed in a case where the shift of the touch position is detected after detecting the touch on the operation surface, and
performs control such that the second type processing is performed in a case where the touch operation of releasing the touch from the operation surface without including the shift of the touch position onto the operation surface is detected after detecting the touch on the operation surface.

25. A method for controlling an electronic apparatus, comprising:
a touch detection step capable of detecting a touch operation performed on an operation surface; and
a control step of performing control of switching between first type processing and second type processing,
the first type processing being processing of displaying an item to be displayed on a display unit, that is located at a position different from the operation surface, at a position of having shifted in accordance with an amount of a shift of the touch position from a position where the item was displayed before detection of the shift of the touch position without displaying, at a position corresponding to a touch start position, the item, and
the second type processing being processing of displaying the item to be displayed on the display unit at a position that is not based on the position where the item was displayed before detection of the touch operation and is based on the position where the touch operation was performed,
wherein the control step
determines whether to perform the first type processing or to perform the second type processing depending on whether a shift of the touch position is detected after detecting a touch on the operation surface or a touch operation of releasing the touch from the operation surface without including the shift of the touch position onto the operation surface is detected after detecting the touch on the operation surface,
performs control such that the first type processing is performed in a case where the shift of the touch position is detected after detecting the touch a touch on the operation surface, and
performs control such that the second type processing is performed in a case where the touch operation of releasing the touch from the operation surface without including the shift of the touch position onto the operation surface is detected after detecting the touch on the operation surface.

26. A method for controlling an electronic apparatus, comprising:
a touch detection step capable of detecting a touch operation performed on an operation surface; and
a control step of performing first type processing and second type processing,
the first type processing being an instruction of pointing a position of having shifted in accordance with an amount of a shift of a touch position from a position that was pointed before detection of the shift of the touch position without pointing a position corresponding to a touch start position, and
the second type processing being an instruction of pointing a position that is not based on the position that was pointed before detection of the touch operation and is based on the position where the touch operation was performed,
wherein the control step
determines whether to perform the first type processing or to perform the second type processing depending on whether a shift of the touch position is detected after detecting a touch on the operation surface or a touch operation of releasing the touch from the operation surface without including the shift of the touch position onto the operation surface is detected after detecting the touch on the operation surface,
performs control such that the first type processing is performed in a case where the shift of the touch position is detected after detecting the touch on the operation surface, and
performs control such that the second type processing is performed in a case where the touch operation of releasing the touch from the operation surface without including the touch position onto the operation surface is detected after detecting the touch on the operation surface.

27. A method for controlling an electronic apparatus, comprising:
a touch detection step capable of detecting a touch operation performed on an operation surface;
a setting step of setting a focus adjustment position; and
a control step of performing first type processing and second type processing,
the first type processing being an instruction of shifting the position selected by the setting step in accordance with the shift of the touch position, and
the second type processing being an instruction of causing the setting step to perform position selection based on the position where the touch operation was performed,
wherein the control step
determines whether to perform the first type processing or to perform the second type processing depending on whether a shift of the touch position is detected after detecting a touch on the operation surface or a touch operation of releasing the touch from the operation surface without including the shift of the touch position onto the operation surface is detected after detecting the touch on the operation surface, performs control such that the first type processing is performed in a case where the shift of the touch position is detected after detecting the touch on the operation surface, and performs control such that the second type processing is performed in a case where the touch operation of releasing the touch from the operation surface without including the shift of the touch position onto the operation surface is detected after detecting the touch a touch on the operation surface.

28. A non-transitory computer readable recording medium which stores a program that causes a computer to function as the units of the electronic apparatus according to claim 1.

29. A non-transitory computer readable recording medium which stores a program that causes a computer to function as the units of the electronic apparatus according to claim 18.

30. A non-transitory computer readable recording medium which stores a program that causes a computer to function as the units of the electronic apparatus according to claim 24.

* * * * *